(12) United States Patent
Marshall et al.

(10) Patent No.: US 7,646,618 B2
(45) Date of Patent: Jan. 12, 2010

(54) METHOD AND SYSTEM FOR CONTROLLING PULSE WIDTH IN A NIGHT VISION SYSTEM POWER SYSTEM

(75) Inventors: Paul Neil Marshall, Avon, CT (US); Craig Boucher, Simsbury, CT (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 429 days.

(21) Appl. No.: 11/259,464

(22) Filed: Oct. 26, 2005

(65) Prior Publication Data

US 2008/0001085 A1 Jan. 3, 2008

(51) Int. Cl.
- H02M 1/10 (2006.01)
- H01J 31/50 (2006.01)
- H01J 40/14 (2006.01)
- H05B 37/02 (2006.01)

(52) U.S. Cl. .................. 363/41; 250/330; 250/214 VT; 315/307

(58) Field of Classification Search .................. 363/15, 363/21.05, 21.07, 21.11, 41, 5, 59; 313/103 CM; 250/214 VT, 330; 315/307, 308, 361; 62/6; 323/266; 359/407, 815
See application file for complete search history.

(56) References Cited

U.S. PATENT DOCUMENTS

| | | | |
|---|---|---|---|
| 3,772,915 A | * 11/1973 | Stamler | .................. 73/861.03 |
| 4,495,460 A | * 1/1985 | Bernays, Jr. | .............. 324/77.11 |
| 4,902,887 A | * 2/1990 | Everett, Jr. | .................. 250/221 |
| 4,924,080 A | 5/1990 | Caserta et al. | ........ 250/213 VT |
| 5,546,299 A | 8/1996 | Lenz | |
| 5,883,381 A | 3/1999 | Saldana | |
| 5,883,794 A | 3/1999 | Takahashi | |
| 6,087,660 A | * 7/2000 | Morris et al. | ................ 250/330 |
| 6,140,574 A | 10/2000 | Snyder | ...................... 174/35 R |
| 6,404,607 B1 | 6/2002 | Burgess | |
| 7,126,103 B2 | * 10/2006 | Michalski et al. | ..... 250/214 VT |
| 2005/0040773 A1 | 2/2005 | Lebens | |
| 2007/0018504 A1 | * 1/2007 | Wiener et al. | ............... 307/108 |

OTHER PUBLICATIONS

Search Report, PCT/US06/35338, Sep. 13, 2006.

* cited by examiner

*Primary Examiner*—Patrick J Assouad
*Assistant Examiner*—M'Baye Diao
(74) *Attorney, Agent, or Firm*—Cantor Colburn LLP

(57) ABSTRACT

A night vision system comprising a power system having a low voltage unit coupled to a high voltage unit; the low voltage unit including a low voltage controller generating a pulse width code; the high voltage unit including an opto-isolator for receiving the pulse width code from the low voltage controller, a high voltage controller operative in response to the pulse width code to generate an output pulse, a pulse shaping module receiving the output pulse and generating a control pulse; and power electronics operative in response to the control pulse.

10 Claims, 2 Drawing Sheets

METHOD AND SYSTEM FOR CONTROLLING PULSE WIDTH IN A NIGHT VISION SYSTEM POWER SYSTEM

BACKGROUND OF THE INVENTION

Night vision systems are used in a number of applications, including military, industrial, commercial, etc. In general, the systems operate by multiplying light received at an image intensifier tube to generate a visible image. Power conservation is typically an issue with personal night vision systems that are powered by portable, battery supplies. Thus, it is beneficial to incorporate power conservation features in the night vision system in order to extend the operation of the night vision system.

BRIEF SUMMARY OF THE INVENTION

Embodiments of the invention include a night vision system comprising a power system having a low voltage unit coupled to a high voltage unit; the low voltage unit including a low voltage controller generating a pulse width code; the high voltage unit including an opto-isolator for receiving the pulse width code from the low voltage controller, a high voltage controller operative in response to the pulse width code to generate an output pulse, a pulse shaping module receiving the output pulse and generating a control pulse; and power electronics operative in response to the control pulse.

Other embodiments of the invention include a method for controlling pulse width in a night vision system having a low power unit and a high power unit, the method comprising: generating a pulse width code in the low power unit; transmitting the pulse width code to the high power unit; generating an output pulse in response to the pulse width code; generating a control pulse in response to the pulse width code; and providing the control pulse to high power electronics.

DETAILED DESCRIPTION

Figure 1:
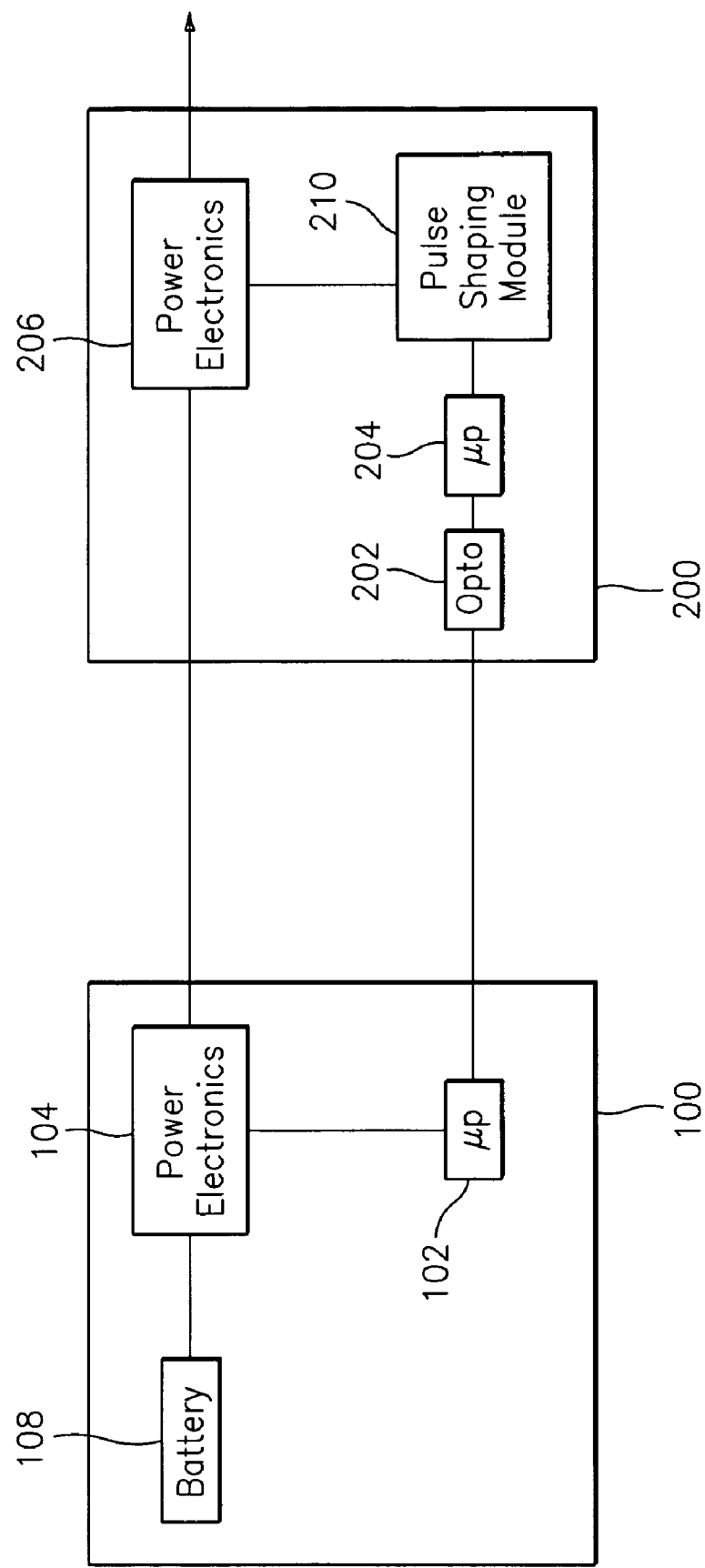
FIG. 1 is a block diagram of power components of a night vision system in exemplary embodiments.

FIG. 1 is a block diagram of power components of a night vision system in exemplary embodiments. The power components include a low voltage unit 100 and a high voltage unit 200. The low voltage unit 100 and the high voltage unit 200 operate with a significant voltage potential difference between them. The low voltage unit 100 includes a low voltage controller 102 in communication with low voltage electronics 104 and an opto-isolator 202 in the high voltage unit 200. The low voltage electronics 104 may include amplifiers, inverters, transformers, etc. A battery 108 is coupled to the low voltage electronics 104 to provide power to the high voltage unit 200.

The low voltage controller 102 may be a general-purpose microprocessor executing a computer code contained on a storage medium. Alternatively, the low voltage controller 102 may be implemented using a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of processes in embodiments of the invention.

The opto-isolator 202 serves as an optically isolated one-way data link used to transfer information from the low voltage unit 100 to the high voltage unit 200. One of the information items is a pulse width code, which represents the desired pulse width. The pulse width code represents the desired pulse width to be used in the high voltage unit and may be calculated, obtained from a look-up-table, etc. In an exemplary embodiment, the pulse width code is an N-bit digital word representing the desired pulse width. Once the pulse width code is received by the high voltage unit 200, the high voltage unit 200 generates a control pulse with a duration between 1250 µs and 300 ns with a resolution of about 1 ns. The opto-isolator 202 receives the pulse width code and provides the pulse width code to the high voltage controller 204. The high voltage controller 204 uses the pulse width code information to interface with pulse shaping module 210 to control high voltage power electronics 206 that bias the night vision system.

In a conventional counting system, pulses of variable length are generated from a counter chain running at a clock rate equal to the inverse of the required resolution. In embodiments of the invention, the clock chain would need to be driven at a clock speed of 1 GHz in order to produce a resolution of 1 ns. The power consumption limits of the high voltage unit 200 preclude the use of such a high clock speed. The high voltage controller 204 has machine cycle frequencies in the low MHz range which is orders of magnitude lower than the clock speed dictated by the required pulse width resolution.

Figure 2:
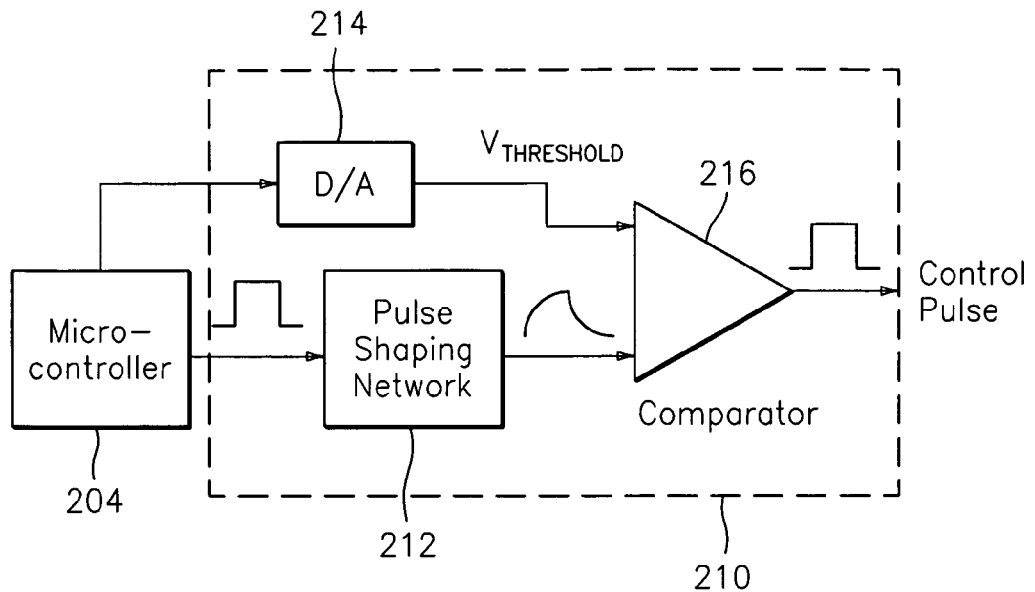
FIG. 2 is block diagram of a pulse shaping module in exemplary embodiments.

In order to provide the suitable pulse width resolution of 1 ns, a pulse shaping module 210 is utilized in the high voltage unit 200. The pulse shaping module 210 receives output pulses from the high voltage controller 204 and shapes the pulses to obtain the desired resolution of about ins without requiring a clock speed of 1 GHz. FIG. 2 is a block diagram of the pulse shaping module 210 and high voltage controller 204.

The pulse shaping module 210 includes a pulse shaping network 212, a digital-to-analog converter 214 and a comparator 216. The high voltage controller 204 generates an output pulse with a low resolution, for example 500 ns. The pulse shaping network 212 uses, for example, RC components to shape the output pulse from the high voltage controller 204 to form a shaped pulse as described in further detail herein. A comparator 216 converts the shaped pulse of the pulse shaping network 212 to a variable width control pulse based on the value of a threshold command sent from the high voltage controller 204 and applied to D/A converter 214. High voltage controller 204 sets the threshold and the output pulse in response to the pulse width code from the low voltage controller 102. By selecting the appropriate output pulse width from the microcontroller (in 500 ns increments) and the appropriate $V_{THRESHOLD}$, through D/A converter, a control pulse of almost any duration can be created.

Figure 3:
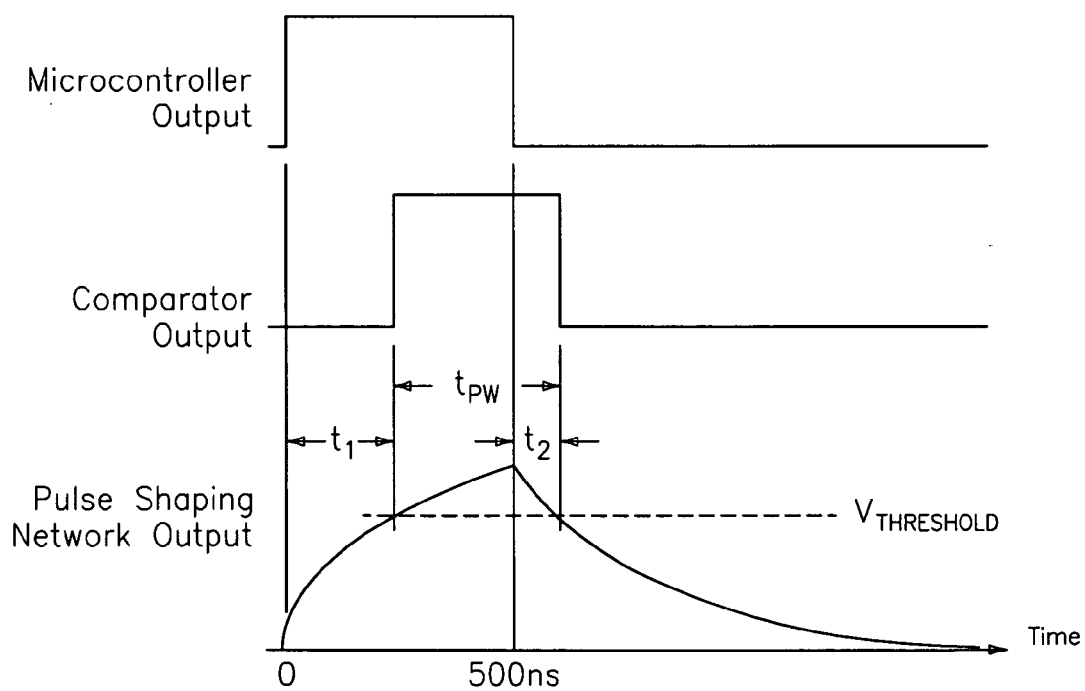
FIG. 3 is a plot of different waveforms in exemplary embodiments.

Unlike a traditional pulse width modulation implementation which uses a triangle wave, the pulse shaping network 212 uses an RC network to shape the output pulse from the high voltage controller 204 into a shaped pulse. The shaped pulse is compared to the threshold at comparator 216. This results in a system non-linearity that needs to be taken into account by the high voltage controller 204. The voltage waveforms at the output of the high voltage controller 204, comparator 216 and pulse shaping network 212 are shown in FIG. 3 for a 500 ns output pulse generated by the microcontroller.

The voltage waveform at the output of the pulse shaping network 212 is defined by two equations, one for the rising portion of the signal and one for the falling as follows:

Rising waveform, 0<t<500 ns, where t is the time and $\tau$ is the pulse shaping network time constant $$V_{RISING} = V_{DD} * (1 - \epsilon^{-t/\tau}) \qquad \text{Eq. 1}$$

Falling waveform, 500 ns>t, where t is the time and $\tau$ is the pulse shaping network time constant $$V_{FALLING} = V_{RISING} * \epsilon^{-t/\tau} = V_{DD} * (1 - \epsilon^{-t/\tau}) * \epsilon^{-t/\tau} \qquad \text{Eq. 2}$$

The maximum output voltage from the pulse shaping network is the rising Eq. 1 at t=500 ns. The pulse width for a given threshold can be found by setting the rising and falling voltages to the desired threshold voltage and then solving each equation for t. Subtracting the value for t from Eq. 1 from 500 ns then adding the value of t found in Eq. 2 yields the pulse width. For example, assume a threshold voltage of 2V, a supply voltage of 5V, and a time constant of 400 ns, the pulse width is:

$$V_{RISING} = 2V = 5V^* (1 - \varepsilon^{-t1/400\text{ns}})$$
$$= t_1 = -400\text{ns}^* \ln(1 - 2V/5V) = 204.3\text{ns}$$
$$V_{FALLING} = 2V = 5V^* (1 - \varepsilon^{-500\text{ns}/400\text{ns}})^* - \varepsilon^{-t2/400\text{ns}}$$
$$= t_2 = -400\text{ns}^* \ln(2V/3.567V) = 231.4\text{ns}$$
$$t_{PW} = 500\text{ns} - t_1 + t_2 = 500\text{ns} - 204.3\text{ns} + 231.4\text{ns} + 527.1\text{ns}$$

This derivation can be generalized for all pulse widths generated by the microcontroller as follows: (where $V_{THRESHOLD}$ is the threshold voltage, $t_{PULSE}$ is the width of the output pulse generated by the microcontroller, $\tau$ is the time constant of the pulse shaping network and $V_{DD}$ is the supply voltage):

$$\text{Pulse Width} = t_{PULSE} - (-\tau * \ln(1 - V_{THRESHOLD}/V_{DD})) + (-\tau * \ln(V_{THRESHOLD}/(V_{DD}*(1 - \epsilon^{-t_{PULSE}/\tau}))))$$

It should be noted that if the D/A 214 provides an output ratioed to its supply voltage and the microcontroller 204 uses the same supply voltage as the D/A, then the equations are ratiometric to the supply voltage and the pulse width is independent of the magnitude of the supply voltage.

As described above, the embodiments of the invention may be embodied in the form of processor-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the essential scope thereof. Therefore, it is intended that the invention not be limited to the particular embodiments disclosed for carrying out the invention, but that the invention will include all embodiments falling within the scope of the appended claims.

What is claimed is:

1. A night vision system comprising:
   a power system having a low voltage unit coupled to a high voltage unit;
   the low voltage unit including a low voltage controller generating a pulse width code;
   the high voltage unit receiving the pulse width code from the low voltage controller, the high voltage unit including a high voltage controller operative in response to the pulse width code to generate an output pulse, a pulse shaping module receiving the output pulse and generating a control pulse, the pulse shaping module includes a pulse shaping network receiving the output pulse and generating a shaped pulse; and
   power electronics operative in response to the control pulse.

2. The night vision system of claim 1 wherein:
   the pulse shaping module includes a comparator for comparing the shaped pulse to a threshold.

3. The night vision system of claim 2 wherein:
   the threshold is generated by the high power controller in response to the pulse width code.

4. The night vision system of claim 3 wherein:
   the pulse shaping module includes a digital-to-analog converter for converting the threshold prior to comparison at the comparator.

5. The night vision system of claim 1 wherein:
   the pulse shaping network is an RC network.

6. The night vision system of claim 1 wherein:
   the control pulse has a resolution of about 1 ns.

7. A method for controlling pulse width in a night vision system having a low power unit and a high power unit, the method comprising:
   generating a pulse width code in the low power unit;
   transmitting the pulse width code to the high power unit;
   generating an output pulse in response to the pulse width code;
   generating a control pulse in response to the pulse width code, generating the control pulse includes shaping the output pulse to define a shaped pulse; and
   providing the control pulse to high power electronics.

8. The method claim 7 wherein:
   generating the control pulse includes comparing the shaped pulse to a threshold.

9. The method of claim 7 wherein:
   shaping the output pulse is performed by an RC network.

10. The method of claim 7 wherein:
    the control pulse has a resolution of about 1 ns.

* * * * *